(12) United States Patent
Kelmenson et al.

(10) Patent No.: US 9,672,284 B2
(45) Date of Patent: Jun. 6, 2017

(54) CATEGORIZING SOCIAL NETWORK OBJECTS BASED ON USER AFFILIATIONS

(71) Applicant: Facebook, Inc., Menlo Park, CA (US)

(72) Inventors: Daniel Leon Kelmenson, San Jose, CA (US); David Stewart Willner, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 539 days.

(21) Appl. No.: 14/245,944

(22) Filed: Apr. 4, 2014

(65) Prior Publication Data

US 2014/0222821 A1    Aug. 7, 2014

Related U.S. Application Data

(62) Division of application No. 12/975,213, filed on Dec. 21, 2010, now Pat. No. 8,738,705.

(51) Int. Cl.
*G06F 15/16*   (2006.01)
*G06F 17/30*   (2006.01)
*G06Q 50/00*   (2012.01)

(52) U.S. Cl.
CPC ....... *G06F 17/30864* (2013.01); *G06Q 50/01* (2013.01)

(58) Field of Classification Search
CPC .......................... G06Q 50/01; G06F 17/30864
USPC ...................................................... 709/205
See application file for complete search history.

(56) References Cited

U.S. PATENT DOCUMENTS

| 7,503,070 | B1* | 3/2009 | Alstyne | G06F 21/6254 726/22 |
| 7,711,779 | B2* | 5/2010 | Goodman | G06F 21/316 709/206 |
| 8,065,370 | B2* | 11/2011 | Hulten | G06Q 10/00 709/206 |
| 8,280,959 | B1* | 10/2012 | Zuckerberg | G06Q 30/02 709/204 |
| 8,306,922 | B1* | 11/2012 | Kunal | G06Q 30/02 705/319 |
| 8,311,950 | B1* | 11/2012 | Kunal | G06Q 30/0201 705/319 |

(Continued)

OTHER PUBLICATIONS

United States Office Action, U.S. Appl. No. 12/975,213, Oct. 28, 2013, 15 pages.

*Primary Examiner* — Imad Hussain
(74) *Attorney, Agent, or Firm* — Fenwick & West LLP

(57) ABSTRACT

Groups of users of a social networking system are categorized based on their association with a type of malicious activity. A set of predetermined malicious groups is identified. Users associated with the malicious groups are selected based on their level of interactions with the malicious groups. Other groups associated with the selected users are identified as being potentially malicious groups. The potentially malicious groups are further analyzed based on occurrences of keywords associated with the type of malicious activity and manual verification by experts. The potentially malicious groups are either classified as being malicious or non-malicious or assigned a score based on their likelihood of being associated with the type of malicious activity. The methods and system disclosed can be used for categorizing other types of social network objects based on their association with a type of malicious activity, for example, users, events, and content.

21 Claims, 3 Drawing Sheets

(56) References Cited

U.S. PATENT DOCUMENTS

| | | | | |
|---|---|---|---|---|
| 8,560,605 B1* | 10/2013 | Gyongyi | G06F 17/30861 | 707/769 |
| 8,560,681 B2* | 10/2013 | Ramirez | H04L 12/588 | 709/204 |
| 8,606,721 B1* | 12/2013 | Dicker | G06Q 10/10 | 705/319 |
| 8,615,442 B1* | 12/2013 | Kapur | G06Q 30/0269 | 705/26.1 |
| 2003/0227479 A1* | 12/2003 | Mizrahi | A63F 13/10 | 715/753 |
| 2006/0294134 A1* | 12/2006 | Berkhim | G06F 17/30616 | |
| 2008/0040126 A1* | 2/2008 | Estrada | G06Q 10/107 | 705/1.1 |
| 2008/0040474 A1* | 2/2008 | Zuckerberg | G06Q 30/02 | 709/224 |
| 2008/0046976 A1* | 2/2008 | Zuckerberg | H04L 63/102 | 726/4 |
| 2008/0077517 A1* | 3/2008 | Sappington | G06Q 10/04 | 705/35 |
| 2008/0256602 A1* | 10/2008 | Pagan | H04L 12/581 | 726/3 |
| 2008/0275861 A1* | 11/2008 | Baluja | G06N 5/02 | |
| 2008/0275899 A1* | 11/2008 | Baluja | G06Q 30/02 | |
| 2008/0288277 A1* | 11/2008 | Fasciano | G06Q 10/00 | 705/319 |
| 2008/0294624 A1* | 11/2008 | Kanigsberg | G06F 17/30867 | |
| 2008/0301116 A1* | 12/2008 | Wang | G06F 17/30864 | |
| 2008/0301139 A1* | 12/2008 | Wang | G06F 17/30887 | |
| 2008/0301281 A1* | 12/2008 | Wang | G06F 21/56 | 709/224 |
| 2009/0070460 A1 | 3/2009 | Shen et al. | | |
| 2009/0070679 A1* | 3/2009 | Shen | G06Q 30/02 | 715/733 |
| 2009/0144418 A1 | 6/2009 | Alstyne et al. | | |
| 2009/0158429 A1 | 6/2009 | Alstyne et al. | | |
| 2009/0228486 A1* | 9/2009 | Kuehr-McLaren | G06F 17/3089 | |
| 2009/0288150 A1* | 11/2009 | Toomim | G06F 21/6218 | 726/5 |
| 2009/0292526 A1* | 11/2009 | Harari | G06F 17/2765 | 704/9 |
| 2009/0327484 A1* | 12/2009 | Chen | G06Q 10/107 | 709/224 |
| 2010/0235489 A1* | 9/2010 | Cogan | G06F 17/30702 | 709/224 |
| 2011/0004692 A1* | 1/2011 | Occhino | H04L 67/16 | 709/228 |
| 2011/0113086 A1* | 5/2011 | Long | G06Q 10/10 | 709/203 |
| 2011/0113096 A1* | 5/2011 | Long | G06Q 30/02 | 709/204 |
| 2011/0153423 A1* | 6/2011 | Elvekrog | G06Q 30/02 | 705/14.53 |
| 2011/0185057 A1* | 7/2011 | Waugaman | A63F 13/12 | 709/224 |
| 2011/0258203 A1* | 10/2011 | Wouhaybi | H04L 12/588 | 707/749 |
| 2011/0294478 A1* | 12/2011 | Trivi | H04M 3/436 | 455/415 |
| 2011/0295982 A1* | 12/2011 | Misra | H04L 63/1425 | 709/220 |
| 2011/0307551 A1* | 12/2011 | Danezis | G06F 17/30522 | 709/204 |
| 2012/0011204 A1* | 1/2012 | Morin | G06Q 10/10 | 709/205 |
| 2012/0015639 A1 | 1/2012 | Trivi et al. | | |
| 2012/0066073 A1* | 3/2012 | Dilip | G06Q 30/0269 | 705/14.66 |
| 2012/0124147 A1 | 5/2012 | Hamlin et al. | | |
| 2012/0124148 A1* | 5/2012 | Hamlin | H04L 51/36 | 709/206 |
| 2012/0124483 A1 | 5/2012 | Zuckerberg et al. | | |
| 2012/0137367 A1* | 5/2012 | Dupont | G06F 21/00 | 726/25 |
| 2012/0158720 A1* | 6/2012 | Luan | G06F 17/30867 | 707/732 |
| 2012/0185486 A1* | 7/2012 | Voigt | H04L 51/32 | 707/741 |
| 2012/0272332 A1 | 10/2012 | Zuckerberg et al. | | |
| 2013/0018823 A1* | 1/2013 | Masood | G06F 21/552 | 706/12 |
| 2013/0124538 A1* | 5/2013 | Lee | G06F 17/3053 | 707/749 |
| 2013/0191372 A1* | 7/2013 | Lee | G06F 17/30958 | 707/722 |
| 2013/0191416 A1* | 7/2013 | Lee | G06F 17/30979 | 707/771 |
| 2013/0218678 A1* | 8/2013 | Benyamin | G06Q 30/0255 | 705/14.53 |
| 2013/0218906 A1* | 8/2013 | Frazier | G06F 17/30035 | 707/749 |
| 2014/0040244 A1* | 2/2014 | Rubinstein | G06F 17/30528 | 707/722 |
| 2014/0040245 A1* | 2/2014 | Rubinstein | G06F 17/30528 | 707/722 |
| 2014/0040246 A1* | 2/2014 | Rubinstein | G06F 17/30554 | 707/722 |
| 2014/0040285 A1* | 2/2014 | Rubinstein | G06F 17/3053 | 707/751 |
| 2014/0101243 A1* | 4/2014 | Naveh | G06Q 50/01 | 709/204 |

* cited by examiner

CATEGORIZING SOCIAL NETWORK OBJECTS BASED ON USER AFFILIATIONS

CROSS REFERENCES TO RELATED APPLICATION

This application is a divisional of U.S. patent application Ser. No. 12/975,213, filed on Dec. 21, 2010, which is incorporated by reference in its entirety into the present application.

BACKGROUND

This invention relates to social networking systems, and in particular to categorizing entities represented in social networking systems as malicious or non-malicious based on interactions of users with the entities.

Social networking systems allow users to establish connections with other users and interact with them. Social networking systems are often used by groups of users with similar interests to interact with each other and collaborate with each other. Users can upload content of interest to the group of users, exchange comments related to the content, organize events associated with the group, and interact using other ways facilitated by the social networking system including, wall posts, direct messages, online chat, and the like.

Groups of users often share interests in a particular type of activity, for example, particular type of music, particular type of religious activity, academic activity, and the like. However, some groups of users may be associated with malicious activities. These malicious activities include unethical, immoral, or illegal activities, or any kind of activity that can cause social harm. For example, a group can be involved in racist activities targeting a particular race or minority group, violent activities, or illegal activities like child pornography.

Social networking systems provide mechanisms to allow users to provide feedback that can be used to determine whether a group, user, or content is associated with malicious activities. For example, users can flag whether certain content is bad. However, the user feedback may not provide an accurate indication of the type of activities associated with an entity or group. User feedback is often influenced by the user's bias and personal preferences. For example, users may flag non-malicious activities as malicious due to their own biases. On the other hand, users may not provide feedback if they are too busy or hesitate to provide feedback. Furthermore, due to the large amount of content available in a social networking system, it is often difficult to ensure that all relevant users are presented with the content they are interested in. Therefore, users that could provide proper feedback may never see the content and therefore never get a chance to provide feedback. As a result, user feedback provides only an approximate and often inaccurate indication of whether an activity, content, or groups is associated with a malicious activity.

SUMMARY

Embodiments of the invention allow categorization of groups of users in a social networking system based on maliciousness of activities associated with the groups. A set of malicious groups of the social networking system are identified as being predetermined to be associated with a type of malicious activity. Users associated with the malicious groups are selected if their interactions with the malicious groups exceed a threshold value. Other groups associated with the selected users are identified as potentially malicious groups. Keywords associated with the type of malicious activity are received. Information associated with each potentially malicious group is searched for occurrences of the keywords. A level of association of each potentially malicious group with the type of malicious activity is determined based on the occurrences of the keywords. The fact that the potentially malicious group is associated with the type of malicious activity is stored. The association of the potentially malicious group with the type of malicious activity may be presented to a user for taking action. A system administrator can review the group information to confirm that the group is actually involved in the malicious activity and act based on the information, for example, by deleting the group, deleting specific members of the group, restricting access to the information published by the group etc.

In an embodiment, the potentially malicious groups are added to the set of predetermined malicious groups responsive to determining that the potentially malicious group is associated with the type of malicious activity. The potentially malicious groups can also be filtered to eliminate groups with interactions with selected users below a threshold measure. The measure of interaction of the users is based on a frequency of interactions of the user with the malicious group, a number of interactions of the user with the malicious group, number of malicious groups that the user interacts with, or types of interactions of the user with the malicious group.

The method of categorization of groups of the social networking system can be used to categorize other types of objects stored in the social networking system based on their association with a type of malicious activity. Examples of objects that can be categorized include users of the social networking system, content items (including text or media content), pages, applications, and events. Social network objects that can be categorized may include any objects with which a social network connection or other interaction can be performed by a user of the social networking system. Moreover, embodiments of the invention may be more broadly applied to identify objects in the social networking system that are related to a given subject or interest, which need not be malicious, based on how users of the social networking system interact with those objects. For example, an embodiment of the invention may be used to identify groups and fan pages for a particular style of music.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
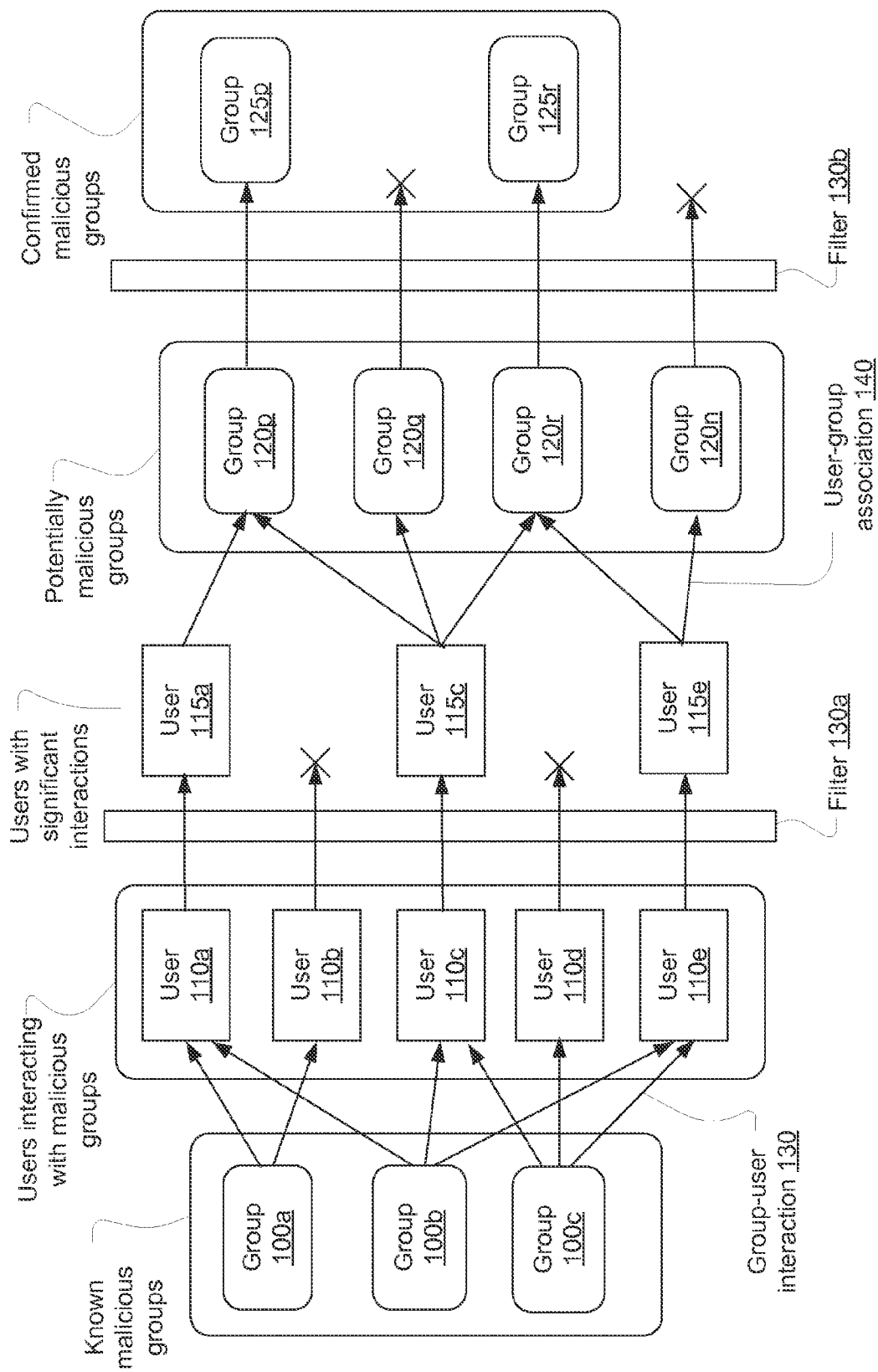
FIG. 1 is a diagram illustrating the process of categorizing groups stored in the social networking system based on a likelihood of the group being associated with a type of malicious activity, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Social networking systems store information about objects representing real world entities and about relationships between these objects (also referred to as social network objects). Examples of objects represented in a social networking system include users, events, groups, images, documents, or videos. Social networking systems track actions performed by users associated with the social network objects. Social network objects can be associated with certain types of malicious activities. Embodiments determine whether social network objects are associated with malicious activities based on interactions of users with the social network objects. Certain social network objects are predetermined to be associated with malicious activities based on analysis of information associated with the objects, for example by manual inspection. A set of users having significant interactions with these objects are determined. Other social network objects that are associated with these users are analyzed to determine whether they are also associated with the malicious activities. The analysis of objects involves searching of keywords describing the malicious activity in information associated with the object and/or manual verification by domain experts.

For example, groups of users can be analyzed to determine whether they are associated with a particular type of malicious activity. Examples of malicious activity include racist hate speech, child pornography and other immoral or illegal activities. Users that interact with these malicious groups are identified. These users can be filtered based on a level of their interaction with the malicious groups. Users with a measure of interactions below a threshold value are eliminated and remaining users analyzed further. Other objects associated with these users are considered potentially malicious and analyzed for their association with the malicious activity. For example, other groups that these users interact with, events that these users attend, content retrieved/posted by these users etc. are considered potentially malicious. Analysis of these potentially malicious objects is performed by searching for keywords associated with the malicious activity in information associated with the objects. The objects can also be inspected manually by a domain expert who can verify if the objects are actually associated with the malicious activity or not. In an embodiment, the process is implemented using a software application with which a user interacts in order to categorize the objects. For example, a domain expert can provide keywords associated with a type of malicious activity and various parameters for determining whether interaction between users and a type of object are significant. The process disclosed identifies groups that are associated with a specific type of malicious activity. Accordingly, if the process is used to identify a particular type of malicious activity, groups associated with a different type of malicious activity are unlikely to be identified. However, the process can be adjusted to broaden the scope of a type of activity, for example, by broadening the scope of the known malicious sets, keywords searched and manual inspection criteria. In general, the process can be used for categorizing any type of social network objects and also for any specific type of activity, not necessarily limited to malicious activities.

FIG. 1 is a diagram illustrating the process of categorizing groups stored in the social networking system based on a likelihood of the group being associated with a type of malicious activity, in accordance with an embodiment of the invention. (A letter after a reference numeral, such as "100a," indicates that the text refers specifically to the element having that particular reference numeral, while a reference numeral in the text without a following letter, such as "100," refers to any or all of the elements in the figures bearing that reference numeral.) The process illustrated in FIG. 1 can be used in general for categorizing social network objects based on a likelihood of the object being associated with a particular type of malicious activity. Examples of social network objects that can be categorized include, users of the social networking system, content including documents, images, and videos stored in the social networking system, groups of users defined in the social networking system, events represented in the social networking system, and the like.

FIG. 1 shows groups 100a, 100b, and 100c that are known to be associated with a certain type of malicious activity. The known malicious groups 100 of users may be involved in an immoral, unethical, or illegal activity such as violence against a minority group, racism, or child pornography. The known malicious groups 100 are groups previously confirmed as being involved in the type of malicious activity. The process of confirmation can include manual verification performed by domain experts and/or automatic verification based on rule based systems. An expert can review activities of a group including content posted by members of the groups, communications associated with the group including messages posted by the members, events organized by members of the groups and the like to confirm whether the group is associated with the particular type of malicious activity.

The social networking system identifies users 110 that interact 130 with the known malicious groups 100. These interactions 130 comprise posting content on the profile of the group in the social networking system, retrieving content associated with the group, becoming a member of the group, liking content associated with the group, and recommending content associated with the group. Other interactions 130 include communicating with other users associated with the group, establishing connections with other users associated with the group, becoming a member of the group, and organizing or attending events associated with the group. Information describing these interactions is typically available in the social networking system, for example, an event may be represented in the social networking system and users may indicate via an RSVP message whether they will be attending the event.

The filter 130a selects users that have significant interactions with the known malicious groups 100. In an embodiment, the filter 130a assigns a score to each user based on a weighted aggregate of various factors describing the user's interactions with the known malicious groups 100. The filter 130a selects users that have significant interactions with the groups and ignores users that have interactions that are below a threshold value. As shown in FIG. 1, the users 110*b* and 110*d* are dropped by the filter 130*a* and the users 115*a*, 115*c*, and 115*e* are selected by the filter 130*a* as having significant interactions with the known malicious groups 100.

A system administrator or a domain expert can specify via a user interface of a software application, various criteria for determining whether interactions of users 110 with the groups are significant. For example, a user that interacts with more than a threshold number of known malicious groups 100 may be considered as having significant interactions. A user that has more than a threshold number of interactions with the known malicious groups may be considered as having significant interactions. A user may be considered as having significant interactions with the known malicious groups 100 if the rate or frequency of interactions is above a threshold value. The frequency of interactions can be measured as the number of interactions of the user within a fixed time interval. Other criteria for determining whether interactions of a user are significant include the types of interactions of the user. For example, posting of content associated with the group is considered more significant compared to retrieving content, becoming a member of the group is considered more significant compared to an interaction between a non-member and a member of the group. The significance of interactions of a user is also measured by how other users react to the interaction by the user, for example, a user posting content or a message associated with the group that is well received by other users is considered more significant compared to content that is rarely retrieved. A content or message is considered as well received if a large number of other users retrieve it, comment on it, like it, or recommend it to other users. The significance of interactions of a user may also depend on the type of membership of the user in the group, for example, interactions by a user that is marked as the president or a treasurer of the group is considered more significant compared to users that are regular members of the group.

The social networking system 100 identifies other groups that the users 110 selected above interact with. These groups are considered potentially malicious groups 120 due to their association with the users selected above. However, it is likely that the users 115 that have significant interactions with known malicious groups 100 also interact with non-malicious groups. For example, a user 115 that interacts with a racist group may also be interested in a group based on a particular type of music. Therefore, the potentially malicious groups 120 are further analyzed to determine whether they are actually malicious or not. The potentially malicious groups may be filtered to retain only groups that have significant interactions with the users 115.

The filter 130*a* performs analysis of the potentially malicious groups 120 to confirm whether the groups are malicious or not. The filter 130*b* can eliminate a potentially malicious group if the interactions of the group with the users 115 are determined to be below a threshold measure. The filter 130*b* analyzes the potentially malicious groups 120 by performing keyword searches on information associated with the groups 120. The keywords may be provided by a system administrator with the help of a user interface of a software application, via a script, or an input file. The keywords correspond to terms that are typically found in content associated with the type of malicious activity that the malicious groups are associated with. The content associated with the malicious group that is searched for keywords comprises text, audio, video content posted by users associated with the group, communications between users associated with the group, messages posted by the users associated with the group (for example, via wall posts), comments provided by users to content including images, videos, documents and the like.

The keywords may be obtained by manual inspection of existing content associated with malicious groups of specific types or by performing textual analysis. For example, textual analysis of content associated with malicious groups may be performed to identify keywords that characterize the content based on frequency of occurrence of the keywords as compared with other terms that occur in the content. Automatic analysis for determining keywords can also be used to assist a system administrator in deciding what keywords to specify.

The potentially malicious groups 120 that are filtered based on keyword analysis as being associated with the type of malicious activity may be further analyzed manually by experts to confirm whether the groups are actually involved with the malicious activity or the groups seem unrelated to the malicious activity. A user interface of a software application allows a user to inspect information associated with the groups including the profiles of users associated with the group, content associated with the group, events associated with the group etc. to determine whether the group is actually involved or is highly likely to be involved with the particular type of malicious activity. Based on a confirmation by an expert, the groups can be determined as confirmed malicious groups 125, or confirmed as non-malicious with respect to the particular malicious activity.

Although, FIG. 1 illustrates how a group can be categorized as malicious or non-malicious, the process illustrated by FIG. 1 can be used in general, to categorize groups based on other criteria. For example, the process illustrated in FIG. 1 can also be used to categorize groups based on religious activities, sports activity, academic activity, and the like. Accordingly, a group can be determined as being associated with a type of religious activity or not, being associated with a type of sports activity or not, etc. Furthermore, the process illustrated by FIG. 1 can be used to categorize other types of objects stored in the social networking system 100. For example, the process can be used to categorize content posted on the social networking system by users, to categorize users, or to categorize events represented in the social networking system based on the association of the corresponding social network objects with malicious activities.

Moreover, although embodiments of the invention described herein relate to groups that are considered malicious, other embodiments may be used to identify groups that share a general subject or interest that need not be malicious. In particular, users of a social networking system will tend to signal their affiliation with similar concepts based on their interaction with objects, such as groups, fan pages, events, content items, etc. While embodiments of the invention can be used to locate additional malicious objects of a given type (e.g., racially offensive content) by seeding the tool with known objects of that type, the commonality among the objects need not be a malicious characteristic. For example, an embodiment of the invention may be used to identify groups and fan pages for a particular style of music.

System Architecture

Figure 2:
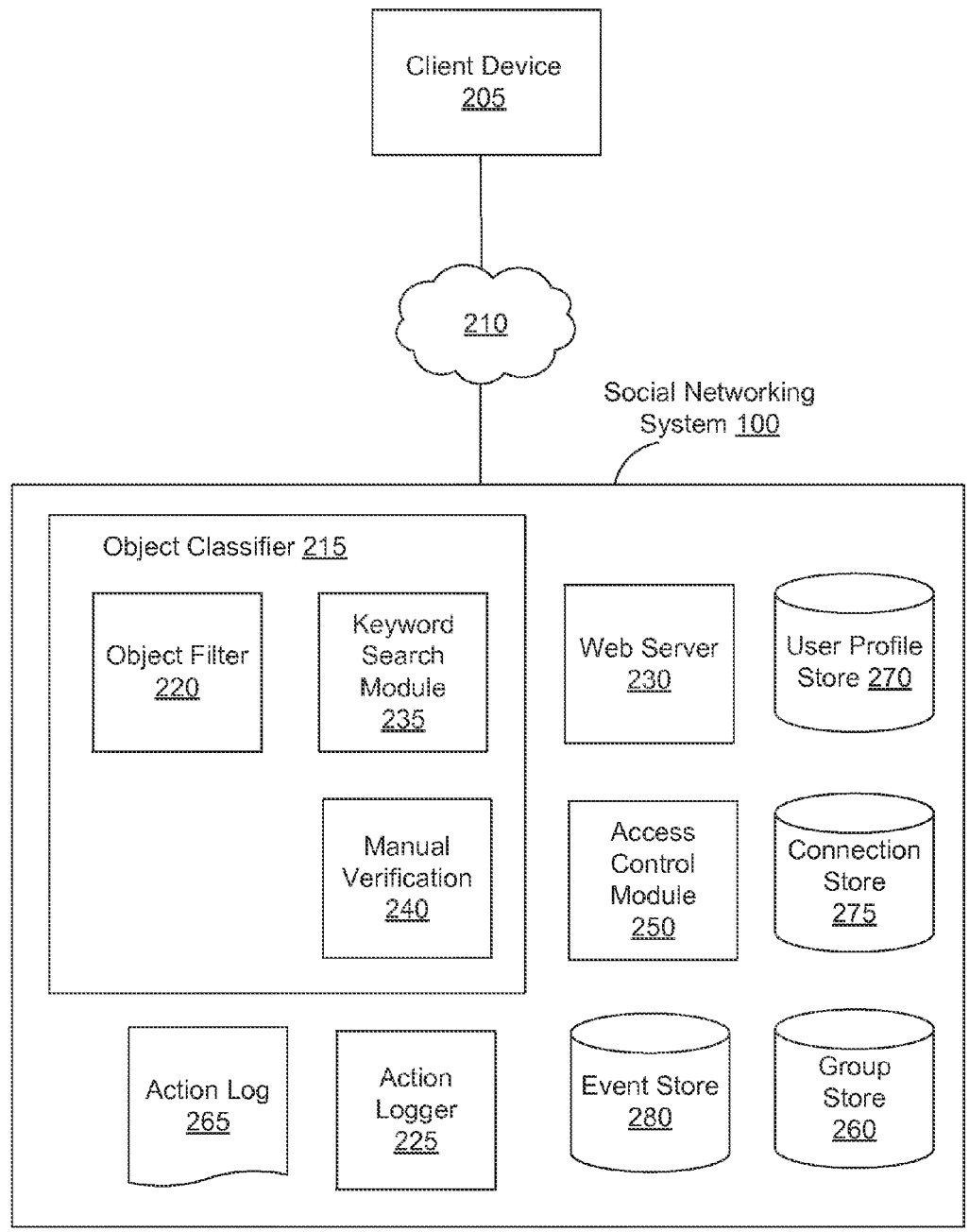
FIG. 2 is a high level block diagram illustrating a system environment suitable for categorizing user-provided content based on affiliations of users with groups, in accordance with an embodiment of the invention.

FIG. 2 is a high level block diagram illustrating a system environment suitable for categorizing groups of users or other social network objects based on their association with a type of malicious activity, in accordance with an embodiment of the invention. The system environment comprises one or more client devices 205, a social networking system 100, and a network 210. In alternative configurations, different and/or additional modules can be included in the system.

The client devices 205 comprise one or more computing devices that can receive user input and can transmit and receive data via the network 210. In one embodiment, the client device 205 is a conventional computer system executing, for example, a Microsoft Windows-compatible operating system (OS), Apple OS X, and/or a Linux distribution. In another embodiment, the client device 205 can be a device having computer functionality, such as a personal digital assistant (PDA), mobile telephone, video game system, etc. The client device 205 is configured to communicate via network 210. The client device 205 can execute an application, for example, a browser application that allows a user of the client device 205 to interact with the social networking system 100. The interactions of the user via the application running on the client device 205 allow a user, system administrator, or an expert to interact with a software application that assists in categorizing social network objects based on their association with certain type of activity.

In one embodiment, the network 210 uses standard communications technologies and/or protocols. Thus, the network 210 can include links using technologies such as Ethernet, 802.11, worldwide interoperability for microwave access (WiMAX), 3G, digital subscriber line (DSL), etc. Similarly, the networking protocols used on the network 210 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 210 can be represented using technologies and/or formats including the hypertext markup language (HTML), the extensible markup language (XML), etc.

The social networking system 100 includes a web server 230, an action logger 225, a user profile store 270, a connection store 275, a group store 260, an event store 280, an action log 265, an object classifier 215, and an access control module 250. The object classifier 215 further comprises modules including an object filter 220, a keyword search module 235 and a manual verification module 240. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The web server 230 links the social networking system 100 via the network 210 to one or more client devices 205. The web server 230 serves web pages, as well as other web-related content, such as Java, Flash, XML, and so forth. The web server 230 may provide the functionality of receiving and routing messages between the social networking system 100 and the client devices 205, for example, instant messages, queued messages (e.g., email), text and SMS (short message service) messages, or messages sent using any other suitable messaging technique. The user can send a request to the web server 230 to upload information, for example, documents, images, or videos. The user can also send a request to connect to another user. If the request for connection is accepted by the other user, a connection between the two users is created and stored in the connection store 275.

The action logger 225 is capable of receiving communications from the web server 230 about user actions on and/or off the social networking system 100. The action logger 225 populates the action log 265 with information about user actions to track them. Any action that a particular user takes with respect to another user is associated with each user's profile, through information maintained in a database or other data repository, such as the action log 265. Such actions may include, for example, adding a connection to the other user, sending a message to the other user, uploading an image, reading a message from the other user, viewing content associated with the other user, attending an event posted by another user, among others. In addition, a number of actions described below in connection with other objects are directed at particular users, so these actions are associated with those users as well.

The social networking system 100 maintains data about objects with which a user may interact on the social networking system 100. To this end, the user profile store 270 and the connection store 275 store instances of the corresponding type of objects maintained by the social networking system 100. Each object type has information fields that are suitable for storing information appropriate to the type of object. For example, the user profile store 270 contains data structures with fields suitable for describing a user's profile. When a new object of a particular type is created, the social networking system 100 initializes a new data structure of the corresponding type, assigns a unique object identifier to it, and begins to add data to the object as needed. This might occur, for example, when a user becomes a user of the social networking system, the social networking system 100 generates a new instance of a user profile in the user profile store 270, assigns a unique identifier to the user profile, and begins to populate the fields of the user profile with information provided by the user.

The user profile information stored in user profile store 235 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with the identification information of the appropriate users displayed in an image.

The connection store 240 stores the information describing the connections between users. The connections are defined by users, allowing users to specify their relationships with other users. For example, the connections allow users to generate relationships with other users that parallel the users' real-life relationships, such as friends, co-workers, partners, and so forth. In some embodiment, the connection specifies a connection type based on the type of relationship, for example, family, or friend, or colleague. Users may select from predefined types of connections, or define their own connection types as needed.

The group store 260 stores information describing user groups defined in the social networking system 100. User groups allow users with a common interest in a particular topic to exchange information and interact. For example, a user group may be formed by users that are interested in a particular type of music, sports, or academic activity. The user group may have a profile similar to a user profile. Users interested in the group may join the group by establishing a connection with the group object. Users that join the group may be provided with higher level of access to information associated with the group compared to users that haven't joined the group.

Users that join the group as well as other users can share information with each other via the user group. For example, text, audio, or video content posted on the group profile by one user may be accessible to all members of the group. Furthermore, users can add comments related to the content as well as view comments posted by other users. In an embodiment, a user may establish a specific type of connection with the user group, for example, the type of the connection of the user with the group may indicate that the user is a founder, president, treasurer, or member of the group.

The event store 280 stores information describing events including the time and location for an event, users that participated in the event, user comments associated with the event and the like. Users can store information describing real world events as well as online events in the social networking system 100. The events may be associated with a particular group, for example, an event can be a conference organized by members of a group. User participation in events can be determined based on RSVP messages sent by users for the event.

The access control module 250 determines whether certain information stored in the social networking system 100 is accessible by a particular user. The access control for information stored in the social networking system is determined by various factors including privacy settings of the user, type of information, status of the user accessing the information etc. In an embodiment, the access control module 250 sets the privacy settings of information associated with a user or group. For example, the access control module 250 can change the privacy settings of a user that is determined to be associated with some malicious activity. Similarly the access control module 250 can change the privacy settings and access associated with content posted by users of a group associated with malicious activities, for example, by restricting access to the information.

The object classifier module 215 performs various steps of the process for categorizing objects based on particular type of activity associated with the object, for example, a type of malicious activity. The object classifier module 215 identifies users associated with social network objects based on the interactions between the users and the objects. The associations between the user and the object are used for categorizing the object, for example, based on potential associations of the object with the malicious activity. The object classifier module 215 performs further analysis of objects suspected of being associated with a malicious activity to confirm whether the object is associated with the malicious activity or not associated with the activity. The analysis of objects is performed using keyword searches on information associated with the objects and by manual verification by domain experts. The object classifier 215 comprises modules including an object filter 220, a keyword search module 235 and a manual verification module 240.

The object filter 220 determines whether the level of interaction between a user and a social network object (e.g., a group, event, or a user) is above a threshold value in order to consider the interaction significant for purposes of determining whether the user and the object are associated. For example, a user that sends an occasional message to a member of a group may not be considered associated with the group, whereas a user that sends frequent messages to several users of a group may be considered associated with the group. Similarly, a user associated with one malicious group may not be considered a malicious user, whereas a user associated with multiple malicious groups may be marked as a malicious user.

The keyword search module 235 analyzes objects based on keyword searches performed on information associated with the objects. The information associated with an object for purposes of performing keyword searches includes messages exchanged between users associated with the object and comments posted by users in relation to the object, for example, comments describing an image or a video. The information searched also includes content associated with the object, for example documents, images, videos posted by users of a group. The information searched includes information associated with a profile of the object, for example, a user group may have a profile stored in the social networking system 100. The keyword search module 235 allows a user (e.g., a domain expert) to enter keywords associated with a particular category of objects, for example, keywords that are likely to be found in information associated with a group involved in a malicious activity.

The manual verification module 240 allows a user to inspect information associated with an object to determine whether the object actually belongs to a particular category, for example, a category of groups associated with a malicious activity. The user is typically a system administrator or a domain expert that can review information associated with an object and make a judgment, whether the object belongs to a particular category. The manual verification module 240 provides the necessary features required by a user to inspect and analyze the information, for example, by performing further keyword searches, building different types of reports, analyzing the information, etc.

The object classifier module 215 uses the various modules described above to determine whether an object belongs to a particular category or not. For example, the object classifier module 215 makes a determination whether a group is associated with a malicious activity or not. In an embodiment, the object classifier module 215 assigns a score to the object indicating the likelihood that the object belongs to a particular category. The information describing the determination made by the object classifier module 215 is stored in the appropriate object store, for example, a determination whether a group is associated with a malicious activity is stored in the group store 260.

Process for Categorizing Groups

Figure 3:
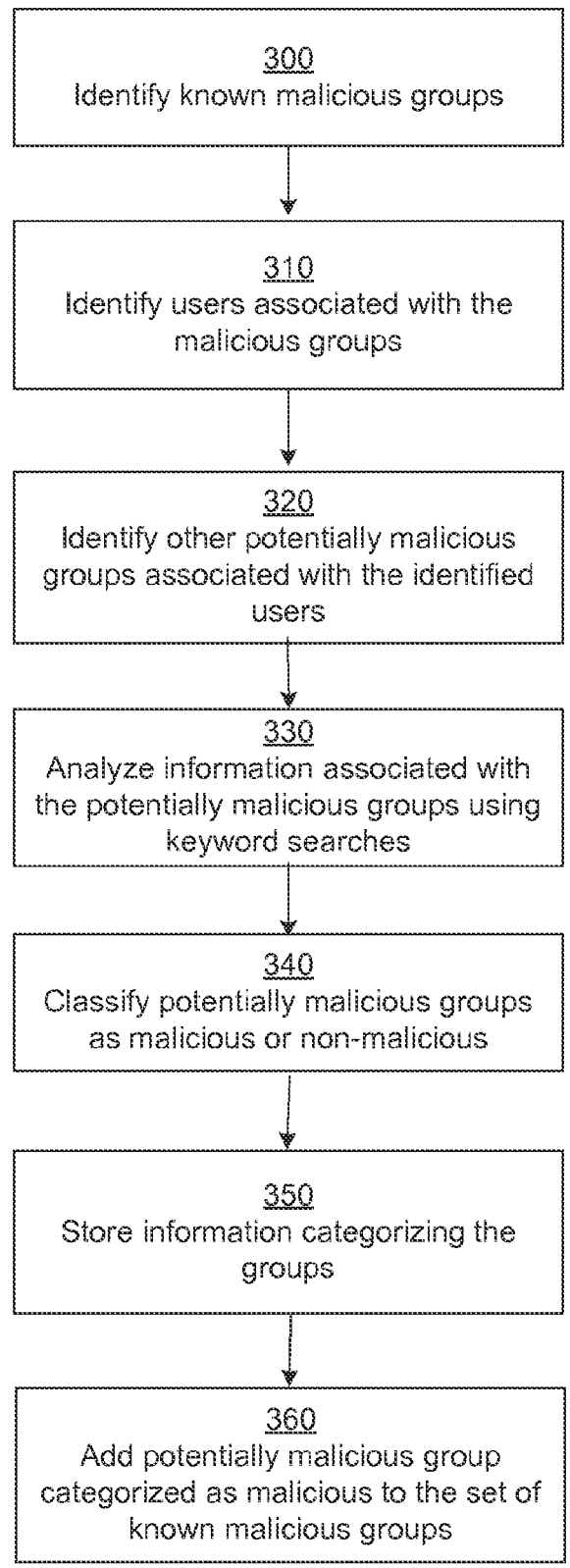
FIG. 3 is a flowchart of a process for categorizing groups of users based on a likelihood of the group being involved in malicious activities, in accordance with one embodiment of the invention.

FIG. 3 is a flowchart of a process for categorizing groups of users based on a likelihood of the group being involved in malicious activities, in accordance with an embodiment of the invention. The flowchart shown in FIG. 3 shows an example of categorization of objects based on their association with a type of activity. However the process can be applied to categorization of other types of objects, for example, users, events, content. Furthermore, the process can be applied to categorization of objects based on different types of activities, for example, sports, religious, political, academic, etc.

The object classifier 215 identifies 300 malicious groups that are predetermined to be associated with a given type of malicious activity. The identification of known malicious groups can be based on a previous analysis that confirmed that the group was associated with the particular type of malicious activity. The previous analysis confirming the association of the group with the malicious activity can comprise manual verification of information associated with the groups by domain experts.

The object classifier 215 identifies 310 users associated with the malicious groups 100. The association of users with the malicious groups 100 can be based on various factor including, interactions of users with members of the group and interactions of the users with the online representation of the group, for example, by posting content associated with the group, commenting on content associated with the group, posting messages associated with the group and the like. In an embodiment, the object classifier 215 determines a measure of interaction of a user with the group based on a weighted aggregate value combining various metrics quantifying the factors describing user interactions with the groups. The object classifier 215 may assign weights based on type of interaction, number of interactions, frequency of interactions, and the number of different malicious groups 100 that a user interacts with. The object filter 220 filters out users with interactions determined to be below a predetermined threshold values and retains users with interactions above the threshold value for further analysis. In an embodiment, the object classifier 215 assigns a maliciousness score to a user based on past activity of the user associated with malicious groups and uses the maliciousness score in making future determinations of associations of the user with malicious activities. The maliciousness score associated with the user may be periodically updated based on recent information associated with the user.

The object classifier 215 identifies 320 other potentially malicious groups 120 associated with the identified users. The potentially malicious groups 120 may be filtered based on the level of interactions of the group with the users identified 310. For example, potentially malicious groups 120 that are associated with very few interactions with the users identified 310 may be ignored whereas potentially malicious groups 120 that are associated with more than a threshold value based on a measure of interactions are analyzed further.

The object classifier 215 performs analysis 330 of the potentially malicious groups 120 to confirm whether the groups 120 are confirmed as groups 125 involved in malicious activities. The keyword search module 235 performs searches based on keywords associated with the type of malicious activity. The keywords for performing the analysis may be provided by a domain expert using a user interface provided by a software application or obtained by automatic topic analysis of information associated with known malicious groups 100 associated with the type of malicious activity. The manual verification module 240 allows a domain expert to inspect information associated with the potentially malicious groups 120. Based on the analysis 330, the object classifier 215 classifies 340 the potentially malicious groups 120 as either malicious or non-malicious. In an embodiment, the object classifier 215 determines a score indicating the likelihood that the group is associated with the type of malicious activity. The object classifier 215 stores 350 the information categorizing the group using the group store 260. The potentially malicious groups 120 that are confirmed as malicious groups 125 are added to the set of known malicious groups 100.

Categorizing Social Network Objects

The process illustrated in FIG. 1 and FIG. 3 can be used for categorizing different types of social network objects for different types of activities. The different types of social network objects that can be categorized include users, events, and content among other types. The types of social network objects that can be categorized may include objects with which a user can establish a connection or otherwise interact in the social networking system 100. In an embodiment, the set of known malicious objects can comprise objects of different types. For example, users can be categorized as malicious based on their associations with groups, events, and content that is predetermined to be associated with the malicious activity.

In an embodiment, the object classifier 215 can categorize content based on their association with a type of malicious activity. Content can include documents, images, and/or videos. The set of known malicious objects can comprise groups of users associated with a type of malicious activity. Users associated with the malicious groups are identified based on their interactions with the malicious groups. Potentially malicious content is identified as content with which the identified user interact, for example, by posting the content, retrieving the content, commenting on the content, liking the content, recommending the content, sending the content in messages to other users, interacting with other users associated with the content, and the like. The potentially malicious content is further analyzed to confirm whether the content is associated with malicious activities, for example, by performing searches of keywords associated with the malicious activity in information associated with the content, and by manual verification performed by domain experts.

In other embodiments, the object classifier 215 can categorize events based on an association of the event with a type of malicious activity. Events include activities performed in the real world that have a representation in the social networking system 100. For example, a conference between users associated with a group can be represented in the social networking system 100. The set of known malicious objects can comprise users associated with the malicious activity, groups of users associated with the malicious activity, and content associated with the malicious activity. Events associated with the identified user are determined based on the interactions of the users with the events. Interactions of users with events can be measured based on comments posted in relation to the event, attendance in the event as indicated by an RSVP message, retrieving information associated with the event etc. The events are confirmed as being associated with malicious activities based on searches of keywords associated with the malicious activity on information describing the events and/or manual verification by domain experts.

In an embodiment, once a social network object is determined to be associated with a malicious activity, the social networking system 100 takes actions to limit access to the information associated with the object. For example, the access control module 250 can restrict access to content associated with the group, disable content associated with the group, or change privacy settings of the group and/or users associated with the group. As a result, information posted on the group profile may be restricted to a limited set of users.

In an embodiment, certain groups may have a very large membership and may get associated with users associated with malicious activities even though the groups themselves are not involved in any type of malicious activity. These groups are identified and confirmed as non-malicious based on keyword searches and manual inspection. These groups are added to a white-list of non-malicious groups. All potentially malicious groups are checked against the white-list to eliminate the groups predetermined to be non-malicious before performing further analysis. White-lists can be maintained for other kinds of social network objects that are categorized. Maintenance of the white-lists improves performance of the process of categorizing objects based on their association with specific type of activity.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
    storing a plurality of social network groups and user interactions performed by users of a social networking system with the plurality of social network groups;
    associating a set of social network groups of the plurality of social network groups with a category;
    selecting a set of users associated with the set of social network groups, comprising, for each social network group from the set of social network groups:
        identifying users performing user interactions with the social network group;
        for each identified user, determining a measure of user interactions of the user with the social network group; and
        including the user in the set of users, responsive to the measure of user interactions of the user with the social network group exceeding a threshold;
    selecting a set of candidate social network groups associated with the set of users, based on user interactions of users from the set of users with the candidate social network groups;
    receiving, by a computer, keywords associated with the category;
    searching for keyword occurrences in content associated with each candidate social network group provided by the users of the social networking system;
    determining whether each candidate social network group is associated with the category based on the keyword occurrences;
    storing information describing the category associated with the one or more of the candidate social network groups; and
    providing information describing a particular social network group to a user for performing an action, the information provided based on the category.

2. The computer implemented method of claim 1, wherein each candidate social network group associated with a selected user is selected responsive to interactions of the selected user with the candidate social network group exceeding a threshold value.

3. The computer implemented method of claim 1, wherein a social network group corresponds to an entity represented in the social networking system with which users of the social networking system can establish a connection.

4. The computer implemented method of claim 1, wherein an interaction of a user with a social network group comprises one of the user uploading information associated with the social network group, the user retrieving information associated with the social network group, or the user establishing a connection with the social network group.

5. The computer implemented method of claim 1, wherein the measure of user interactions of the user with the social network group is based on one of a frequency of interaction of the user with the social network group, a number of interactions of the user with the social network group object, a number of social network groups that the user interacts with, and a type of interactions of the user with the social network group.

6. The computer implemented method of claim 1, wherein the content associated with each candidate social network group comprises one or more of messages sent by users associated with the candidate social network groups, content uploaded to the social networking system by users associated with the candidate social network groups, and content retrieved from the social networking system by users associated with the candidate social network groups.

7. The computer implemented method of claim 1, further comprising:
    responsive to determining that a candidate social network group is associated with the category, adding the candidate social network group to the set of social network groups.

8. The computer implemented method of claim 1, further comprising:
    presenting information describing the association of each candidate social network group with the category; and
    receiving input verifying the association of each candidate social network group with the category.

9. A computer program product comprising a non-transitory computer-readable storage medium storing computer-executable code comprising instructions for:

storing a plurality of social network groups and user interactions performed by users of a social networking system with the plurality of social network groups;

associating a set of social network groups of the plurality of social network groups with a category;

selecting a set of users associated with the set of social network groups, comprising, for each social network group from the set of social network groups:

identifying users performing user interactions with the social network group;

for each identified user, determining a measure of user interactions of the user with the social network group; and including the user in the set of users, responsive to the measure of user interactions of the user with the social network group exceeding a threshold;

selecting a set of candidate social network groups associated with the set of users, based on user interactions of users from the set of users with the candidate social network groups;

receiving, by a computer, keywords associated with the category;

searching for keyword occurrences in content associated with each candidate social network group provided by the users of the social networking system;

determining whether each candidate social network group is associated with the category based on the keyword occurrences;

storing information describing the category associated with the one or more of the candidate social network groups;

providing information describing a particular social network group to a user for performing an action, the information provided based on the category.

10. The computer program product of claim 9, wherein each candidate social network group is selected responsive to interactions of the selected user with the candidate social network group object exceeding a threshold value.

11. The computer program product of claim 9, wherein a social network group corresponds to an entity represented in the social networking system with which users of the social networking system can establish a connection.

12. The computer program product of claim 9, wherein an interaction of a user with a social network group comprises one of the user uploading information associated with the social network group, the user retrieving information associated with the social network group, or the user establishing connections in the social networking system with other users associated with the social network group.

13. The computer program product of claim 9, wherein the measure of user interactions of the user with the social network group is based on one of a frequency of interaction of the user with the social network group, a number of interactions of the user with the social network group, a number of social network groups that the user interacts with, and a type of interactions of the user with the social network group.

14. The computer program product of claim 9, wherein the content associated with each candidate social network group comprises one or more of messages sent by users associated with the candidate social network groups, content uploaded to the social networking system by users associated with the candidate social network groups, and content retrieved from the social networking system by users associated with the candidate social network groups.

15. The computer program product of claim 9, wherein the computer-executable code further comprises instructions for:

responsive to determining that a candidate social network group is associated with the category, adding the candidate social network group to the set of social network groups.

16. The computer program product of claim 9, wherein the computer-executable code further comprises instructions for:

presenting information describing the association of each candidate social network group with the category; and receiving input verifying the association of each candidate social network group with the category.

17. A computer system comprising:

a computer processor;

a non-transitory computer readable storage medium, storing instructions program product comprising a non-transitory computer-readable storage medium storing instructions for:

storing a plurality of social network groups and user interactions performed by users of a social networking system with the plurality of social network groups;

associating a set of social network groups of the plurality of social network groups with a category;

selecting a set of users associated with the set of social network groups, comprising, for each social network group from the set of social network groups:

identifying users performing user interactions with the social network group;

for each identified user, determining a measure of user interactions of the user with the social network group; and including the user in the set of users, responsive to the measure of user interactions of the user with the social network group exceeding a threshold;

selecting a set of candidate social network groups associated with the set of users, based on user interactions of users from the set of users with the candidate social network groups;

receiving, by a computer, keywords associated with the category;

searching for keyword occurrences in content associated with each candidate social network group provided by the users of the social networking system;

determining whether each candidate social network group is associated with the category based on the keyword occurrences;

storing information describing the category associated with the one or more of the candidate social network groups; and providing information describing a particular social network group to a user for performing an action, the information provided based on the category.

18. The computer system of claim 17, wherein each candidate object associated with a selected user is selected responsive to interactions of the selected user with the candidate object exceeding a threshold value.

19. The computer system of claim 17, wherein a social network group corresponds to an entity represented in the social networking system with which users of the social networking system can establish a connection.

20. The computer system of claim 17, wherein an interaction of a user with a social network group comprises one of the user uploading information associated with the social network group, the user retrieving information associated with the social network group, or the user establishing connections in the social networking system with other users associated with the social network group.

21. The computer system of claim 17, wherein the measure of user interactions of the user with the social network group is based on one of a frequency of interaction of the user with the social network group, a number of interactions of the user with the social network group, a number of social network groups that the user interacts with, and a type of interactions of the user with the social network group.

* * * * *

UNITED STATES PATENT AND TRADEMARK OFFICE
CERTIFICATE OF CORRECTION

PATENT NO. : 9,672,284 B2
APPLICATION NO. : 14/245944
DATED : June 6, 2017
INVENTOR(S) : Daniel Leon Kelmenson et al.

It is certified that error appears in the above-identified patent and that said Letters Patent is hereby corrected as shown below:

In the Claims

Column 14, Line 41, after "group," delete "object".

Column 15, Line 32-33, after "groups;" insert -- and --.

Column 15, Line 40, after "group," delete "object".

Column 16, Line 56-57, delete "wherein each candidate object associated," insert -- wherein each candidate social network group associated --.

Column 16, Line 59, delete "candidate object exceeding a threshold value," insert -- candidate social network group exceeding a threshold value --.

Signed and Sealed this
Sixth Day of February, 2018

Joseph Matal
*Performing the Functions and Duties of the
Under Secretary of Commerce for Intellectual Property and
Director of the United States Patent and Trademark Office*